United States Patent
Tien et al.

(10) Patent No.: US 11,675,958 B2
(45) Date of Patent: *Jun. 13, 2023

(54) LITHOGRAPHY SIMULATION METHOD

(71) Applicant: TAIWAN SEMICONDUCTOR MANUFACTURING COMPANY, LTD., Hsinchu (TW)

(72) Inventors: Fu An Tien, Hsinchu (TW); Hsu-Ting Huang, Hsinchu (TW); Ru-Gun Liu, Zhubei (TW); Shih-Hsiang Lo, Hsinchu (TW)

(73) Assignee: TAIWAN SEMICONDUCTOR MANUFACTURING COMPANY, LTD., Hsinchu (TW)

( * ) Notice: Subject to any disclaimer, the term of this patent is extended or adjusted under 35 U.S.C. 154(b) by 0 days.

This patent is subject to a terminal disclaimer.

(21) Appl. No.: 17/390,833

(22) Filed: Jul. 30, 2021

(65) Prior Publication Data

US 2021/0357571 A1 Nov. 18, 2021

Related U.S. Application Data

(63) Continuation of application No. 16/584,396, filed on Sep. 26, 2019, now Pat. No. 11,080,458.

(Continued)

(51) Int. Cl.
*G06F 30/30* (2020.01)
*G06F 30/398* (2020.01)
(Continued)

(52) U.S. Cl.
CPC ....... *G06F 30/398* (2020.01); *G01N 21/9503* (2013.01); *G03F 1/36* (2013.01); *G03F 7/70441* (2013.01); *G06F 30/337* (2020.01); *G06F 30/3308* (2020.01); *G03F 1/70* (2013.01); *G03F 7/705* (2013.01); *G03F 7/70633* (2013.01); *G06F 30/30* (2020.01); *G06F 2119/18* (2020.01)

(58) Field of Classification Search
None
See application file for complete search history.

(56) References Cited

U.S. PATENT DOCUMENTS

| 6,077,310 A | 6/2000 | Yamamoto et al. |
| 6,114,071 A | 9/2000 | Chen et al. |

(Continued)

OTHER PUBLICATIONS

P. Quemere et al., "Dependencies of bias tables to pattern density, critical dimension, global coordinates and pattern orientation for nanoimprint master manufacturing for the 200 mm wafer scale SmartNIL process," Proc. SPIE vol. 10588, Mar. 20, 2018, 9 pages. (Year: 2018).

(Continued)

*Primary Examiner* — Leigh M Garbowski
(74) *Attorney, Agent, or Firm* — McDermott Will & Emery LLP (57) ABSTRACT

In a method of optimizing a lithography model in a lithography simulation, a mask is formed in accordance with a given layout, a wafer is printed using the mask, a pattern formed on the printed wafer is measured, a wafer pattern is simulated using a wafer edge bias table and the given mask layout, a difference between the simulated wafer pattern and the measured pattern is obtained, and the wafer edge table is adjusted according to the difference.

20 Claims, 7 Drawing Sheets

Related U.S. Application Data (60) Provisional application No. 62/738,328, filed on Sep. 28, 2018.

(51) Int. Cl.
*G03F 7/00* (2006.01)
*G01N 21/95* (2006.01)
*G03F 1/36* (2012.01)
*G06F 30/3308* (2020.01)
*G06F 30/337* (2020.01)
*G06F 119/18* (2020.01)
*G03F 1/70* (2012.01)

(56) References Cited

U.S. PATENT DOCUMENTS

| | | |
|---|---|---|
| 6,523,162 B1 | 2/2003 | Agrawal et al. |
| 6,777,146 B1 | 8/2004 | Samuels |
| 6,783,904 B2 | 8/2004 | Strozewski et al. |
| 6,835,510 B2 * | 12/2004 | Chen .................. G03F 1/34 430/394 |
| 7,147,976 B2 | 12/2006 | Liebmann et al. |
| 8,078,995 B2 | 12/2011 | Tirapu Azpiroz et al. |
| 8,612,902 B1 | 12/2013 | Agarwal et al. |
| 9,262,558 B2 | 2/2016 | Huang et al. |
| 9,500,945 B1 | 11/2016 | Ning et al. |
| 9,817,927 B2 | 11/2017 | Ning et al. |
| 10,295,912 B2 | 5/2019 | Saib et al. |
| 10,386,715 B2 * | 8/2019 | Wang .................. G03F 1/36 |
| 10,534,257 B2 * | 1/2020 | Tetiker .................. G03F 1/70 |
| 11,080,458 B2 * | 8/2021 | Tien .................. G03F 7/70441 |
| 2003/0233630 A1 | 12/2003 | Sandstrom et al. |
| 2017/0168401 A1 | 6/2017 | Saib et al. |

OTHER PUBLICATIONS

H. Teyssedre et al., "Application of rules-based corrections for wafer scale nanoimprint processes and evaluation of predictive models," Proc. SPIE vol. 10775, Sep. 19, 2018, 8 pages. (Year: 2018).

Non-Final Office Action issued in U.S. Appl. No. 16/584,396, dated Dec. 8, 2020.

Notice of Allowance issued in U.S. Appl. No. 16/584,396, dated Mar. 23, 2021.

* cited by examiner

LITHOGRAPHY SIMULATION METHOD

RELATED APPLICATIONS

This application is a continuation of U.S. patent application Ser. No. 16/584,396 filed Sep. 26, 2019, now U.S. Pat. No. 11,080,458, which claims priority to U.S. Provisional Patent Application No. 62/738,328 filed Sep. 28, 2018, the entire contents of each of which are incorporated herein by reference.

BACKGROUND

Creating accurate masks used in lithography processes for making integrated circuits is more challenging as the feature sizes of integrated circuits get smaller. As the feature size decreases below the diffraction limit of the illuminating radiation used in lithography, distortions resulting from, for example, higher order optical effects can create unwanted features in the pattern generated on the wafer. Thus, a pattern generated by a given layout is often simulated using lithography models before finalizing the layout. The simulated pattern is then compared to the actual pattern generated by the layout to refine the lithography model.

BRIEF DESCRIPTION OF THE DRAWINGS

The present disclosure is best understood from the following detailed description when read with the accompanying figures. It is emphasized that, in accordance with the standard practice in the industry, various features are not drawn to scale and are used for illustration purposes only. In fact, the dimensions of the various features may be arbitrarily increased or reduced for clarity of discussion.

DETAILED DESCRIPTION

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus/device may be otherwise oriented (rotated 90 degrees or at other orientations) and the spatially relative descriptors used herein may likewise be interpreted accordingly. In addition, the term "made of" may mean either "comprising" or "consisting of" In the present disclosure, a phrase "one of A, B and C" means "A, B and/or C" (A, B, C, A and B, A and C, B and C, or A, B and C), and does not mean one element from A, one element from B and one element from C, unless otherwise described.

While methods disclosed herein are illustrated and described as a series of acts or events, it will be appreciated that the illustrated ordering of such acts or events are not to be interpreted in a limiting sense. For example, some acts may occur in different orders and/or concurrently with other acts or events apart from those illustrated and/or described herein. In addition, not all illustrated acts may be required to implement one or more aspects or embodiments of the description herein. Further, one or more of the acts depicted herein may be carried out in one or more separate acts and/or phases.

Terms like "simulate," "optimize," "adjust," "creating," "manufacture," "fabricate," "make," "form," "compare," "generate," "choose," "determine," "calculate," "measure," are used to describe operations of the disclosed methods, apparatus, or system. These terms denote the operations that are performed, for example, by one or more computers connected to or disconnected from a network and having a user interface to receive user/designer's inputs and/or commands and a data communication interface or a network interface so as to exchange data with semiconductor manufacturing tools including, but not limited to, a lithography tool and an e-beam writer, and semiconductor testing (or characterization, measurement, or metrology) tools including, but not limited to, a scanning electron microscope. The operations that correspond to these terms can vary depending on the particular implementation and are readily discernible by one of ordinary skill in the art.

Some or all of the disclosed techniques/operations/steps can be implemented in whole or in part by software comprising computer-executable instructions stored on a computer-readable medium. Such software can include, for example, an appropriate electronic design automation ("EDA") software tool. Such software can be executed on one or more computers or computer systems. For clarity, only certain selected aspects of the software-based implementations are described. Other details that are well known in the art are omitted. For example, it should be understood that the disclosed technology is not limited to any specific computer language, program, or computer. For example, the disclosed technology can be implemented using any commercially available computer executing a program written in any commercially available or otherwise suitable language.

Any of the disclosed methods can alternatively be implemented (partially or completely) in hardware such as processors, transitory and non-transitory memory devices, and various circuits.

Because of the complexity of some electronic design automation processes and the large size of many circuit designs, various electronic design automation tools are configured to operate on a computing system capable of simultaneously running multiple processing threads or multiple processors. The components and operation of a computer network may include a host or master computer and one or more remote or servant computers.

Any data produced from any of the disclosed methods (e.g., intermediate or final test patterns, test pattern values, parameters, or control data) can be stored on a computer-readable storage medium (e.g., tangible computer-readable medium, such as one or more CDs, volatile memory components (such as DRAM or SRAM), or nonvolatile memory components (such as hard drives)), using a variety of different data structures or formats. Such data can be created, updated, or stored using a local computer or over a network (e.g., by a server computer), and can be exchanged among the computers, the semiconductor manufacturing tools, and the semiconductor testing tools.

In some embodiments, a photomask refers to a patterned substrate used in a lithography process to pattern a photoresist coated on a semiconductor wafer. In the following description, photomask, mask and reticle are used exchangeably. Although only one photomask is to be described in some embodiments, one of ordinary skill in the art should understand that more photomasks can be manufactured in accordance with the design principle of this disclosure so that various layers can be made with the photomasks to construct an integrated circuit.

In some embodiments, mask layout, mask data, or electron beam shot map refers to a type of electronic file or data, which is readable by a semiconductor manufacturing tool or a semiconductor testing tool to allow the semiconductor manufacturing tool or the semiconductor testing tool to obtain information contained in the electronic file or data. The information includes, but is not limited to, locations in a mask to be manufactured and properties of such locations (i.e., whether to allow portions of a photoresist layer to remain or be removed after being exposed with the manufactured mask based on such electronic file or data, followed by a developing process).

In some embodiments, a semiconductor manufacturing tool or a semiconductor testing tool refers to a tool including, but not limited to, one of a motor; optical components such as a light source or lens; an image capturing device; and a computer including a processor; a user interface; transitory and/or non-transitory computer-readable storage medium; and software, program, or instructions stored on the non-transitory computer-readable medium, that when executed, cause the processor of the computer to generate commands to control operations of hardware or software modules of the semiconductor manufacturing tool or the semiconductor testing tool.

A lithography simulation is calibrated or optimized based on, for example, photo resist properties, lithography tools and/or properties of an underlying layer (substrate) (e.g., reflectivity). For example, a lithography simulation is used to determine a size, a shape and/or a location of an optical proximity correction (OPC) pattern to be added to an original pattern, so that the pattern with the OPC pattern results in the desired resist pattern on a substrate. A lithography simulation includes various parameters, and the parameters are adjusted, modified and/or optimized by comparing the simulated aerial image and/or resist pattern with the actually formed resist pattern.

In embodiments of the present disclosure, instead of or in addition to optimizing the parameters of a lithography simulation, a wafer edge bias table is provided and the wafer edge bias table is calibrated, adjusted and/or optimized by comparing the simulated aerial image and/or resist pattern with the actually formed resist pattern.

Figure 1:
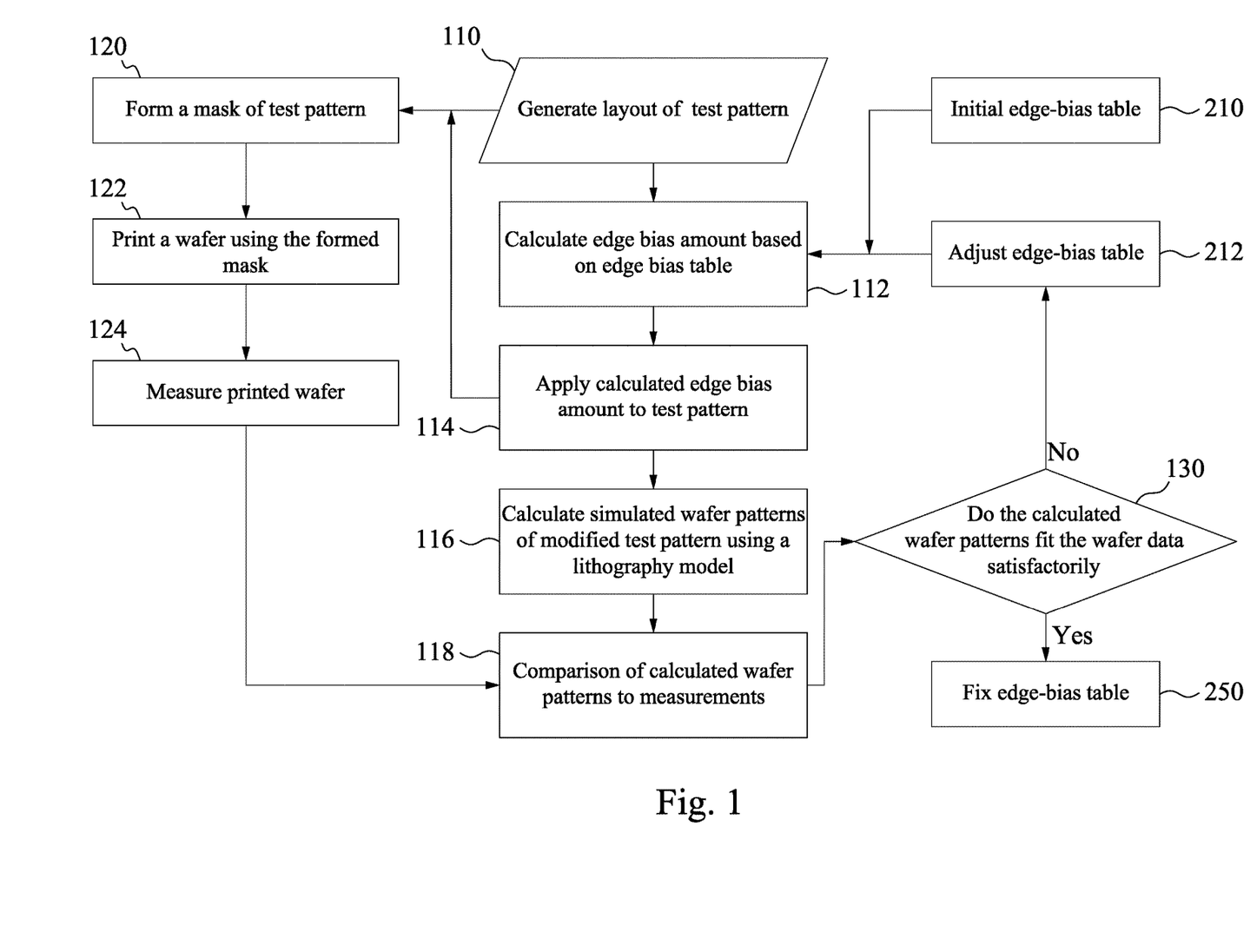
FIG. 1 illustrates a flow chart for a method of optimizing a lithography simulation system according to some embodiments of the present disclosure.

FIG. 1 illustrates a flow chart for a method of calibrating or optimizing a lithography simulation according to an embodiment of the present disclosure. It is understood that additional operations can be provided before, during, and after processes shown by FIG. 1, and some of the operations described below can be replaced or eliminated, for additional embodiments of the method. The order of the operations/processes may be interchangeable.

The method includes, at 110, forming or generating a layout of a test pattern. The test pattern can be a part of an actual circuit pattern, or a purely a test pattern prepared for the purpose of simulation calibration. The layout of the test pattern is formed in a data format such as, for example, a graphic a graphic data system (GDS or GDSII) and an open artwork system interchange standard (OASIS or OAS) proposed by Semiconductor Equipment and Materials International (SEMI) in various embodiments. In some embodiments, the layout is generated using a computer implementing an electronic design automation (EDA) software or tool. For the purposes of the present disclosure, unless explicitly stated otherwise or made clear by the context, the terms "layout", "mask layout", "IC layout", "test layout" are used interchangeably.

In some embodiments, the test design layout includes a part of or whole circuit patterns designed for an actual IC product, based on the specification of the IC product. The layout is designed by a designer in some embodiments. In one example, the designer is a design house. In another example, the designer is a design team separated from a semiconductor manufacturer that is capable of making IC products according to the IC design layout. In various embodiments, the semiconductor manufacturer is capable of making photomasks, IC products, or both. The designer, based on the specification of the product to be manufactured, implements a proper design procedure to generate the IC design layout. The design procedure includes logic design, physical design, and/or place and route in some embodiments. As an example, a portion of the IC design layout includes various IC features (also referred to as main features), such as active region, doped wells, source and drain, gate electrode, vias/contacts and metal lines of the interlayer interconnection, and openings for bonding pads, to be formed in a semiconductor substrate (such as a silicon wafer) and various material layers disposed over the semiconductor substrate. The IC design layout, in some embodiments, also includes certain assist features, such as those features for imaging effect, process or product testing and/or calibration, and/or mask identification information. In a case in which the layout is generated by a design house other than the semiconductor manufacturer, the method additionally includes another operation receiving, by the semiconductor manufacturer, electronic data of the generated layout delivered from the design house. The electronic data of the generated layout can be delivered by internet or a portable data storage, or combination thereof. The semiconductor manufacturer can use the received electronic data of the generated layout to perform the remaining operations.

In other embodiments, the test pattern is created for the purpose of simulation calibration. In such cases, the test pattern may include some critical features, for example, features near the resolution limit of a lithography tool, features vulnerable to process variation, and/or features requiring special care.

At 120, a photomask of the test pattern is formed based on the layout generated at 110. The photomask is made by a mask making process, performed by a photomask manufacturing tool such as an electron-beam writer using the mask data (e.g., the layout generated at 110). In some embodiments, an e-beam or a mechanism of multiple e-beams is used to form a pattern on the mask based on the layout generated at 110. The mask can be designed in various suitable technologies. In one embodiment, the mask is designed to have a binary pattern. In this case, the mask pattern includes dark regions and bright regions. The radiation beam (e.g. ultraviolet or electron beam), used to expose the photo-sensitive material layer (such as photoresist) coated on a wafer, is blocked by the dark region and transmitted through the bright regions. In one example, the binary mask includes a transparent substrate (e.g., fused quartz), and an opaque material (e.g., chromium) coated in the dark regions of the mask.

In another embodiment, the mask is designed to have a phase shift and can be referred to as a phase shift mask, various features in the pattern formed on the mask are configured to have proper phase differences to enhance the resolution and imaging quality. In various examples, the phase shift mask can be an attenuated phase shift mask or an alternating phase shift mask.

In some other embodiments, the mask is an extreme ultraviolet (EUV) mask having a reflective pattern. In one example, the EUV mask includes a substrate made of a suitable material, such as a low thermal expansion material (LTEM). In various examples, the LTEM includes fused quartz, $TiO_2$ doped $SiO_2$, or other suitable materials with low thermal expansion. The EUV mask includes a reflective multiple layers (ML) deposited on the substrate. The ML includes a plurality of film pairs, such as molybdenum-silicon (Mo/Si) film pairs (e.g., a layer of molybdenum above or below a layer of silicon in each film pair). Alternatively, the ML may include molybdenum-beryllium (Mo/Be) film pairs, or other suitable materials that are configurable to highly reflect the EUV light. The EUV mask may further include a capping layer, such as ruthenium (Ru), disposed on the ML for protection. The EUV mask further includes an absorption layer, such as a tantalum boron nitride (TaBN) layer, deposited over the ML. The absorption layer is patterned to define a layer of an integrated circuit (IC). Alternatively, another reflective layer may be deposited over the ML and is appropriately patterned to define a layer of an integrated circuit, thereby forming an EUV phase shift mask.

At 122, the photomask formed at 120 is used to form a photo resist pattern on a substrate (wafer) using lithography techniques. In various embodiments, a layer of photosensitive material is provided on a substrate and exposed to an actinic radiation beam transmitted through or reflected from the photomask formed at 120. In some embodiments, the substrate wafer is unpatterned, and in other embodiments, the substrate wafer has one or more patterned layers with patterns previously printed using lithography, deposition and/or etching processes. In some embodiments, the layout generated at 110 includes test structures used for calibration of the lithography simulation system. An unpatterned substrate is used to avoid complications resulting from uneven surface of a patterned substrate wafer. In some embodiments, the unpatterned substrate includes a silicon wafer with no additional layer. In other embodiments, one or more layers of insulating material, such as silicon dioxide or silicon nitride, semiconductor material, or conductive material, such as W, Cu, Al, or alloys thereof. This thickness of the additional layer is not particularly limited. In such embodiments, the photosensitive layer, e.g., of a photoresist material, is disposed on the wafer, e.g., by spin coating, exposed to the actinic radiation beam through or reflected from the mask, and developed to form a patterned photoresist layer on the wafer.

At 124, the photo resist patterns formed on the wafer are measured. Various parameters relating to the pattern are measured during this measurement. Examples of parameters measured include, but are not limited to, physical dimensions of a given pattern, distances between the given pattern and its neighbors, line width roughness corresponding to the given pattern, radius of curvature of any corners rounded because of lithography processes, side wall angle, etc. In some embodiments, the measurements are obtained by imaging the printed wafer using, e.g., a scanning electron microscope (SEM), and measuring various parameters of the printed structures/patterns of the corresponding SEM image. In some embodiments, other metrological techniques such as, for example, an atomic force microscope (AFM), a scanning tunneling microscope (STM), or a transmission electron microscope (TEM), etc. are used for measuring some specific parameters such as, for example, surface roughness, where needed. In various embodiments, the measurement process is automated using a specially configured SEM, typically known as CD-SEM, that is equipped with a software program for automatically measuring CD of the patterns in the SEM image using, for example, edge detection algorithms. In various embodiments, the measurements performed at 124 are stored in a computer-readable memory for later use.

Figure 2:
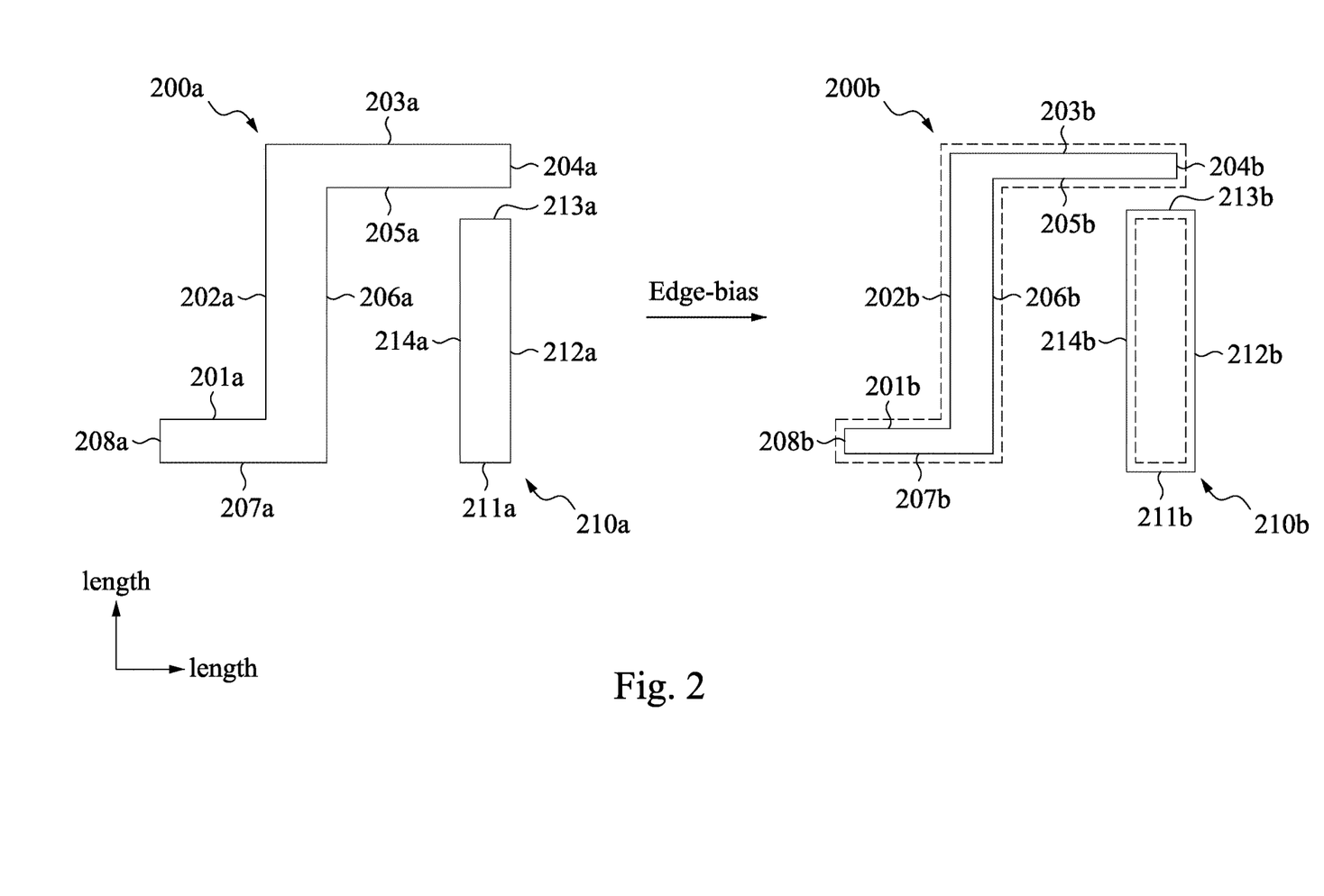
FIG. 2 schematically illustrates application of an edge bias to a test pattern according to an embodiment of the present disclosure.

At 112, an initial wafer edge bias amount is calculated or determined, and at 114, the calculated or determined wafer edge bias is applied to the test pattern. The wafer edge bias amount is a length of how much the edge is moved along the direction normal (perpendicular) to the edge. FIG. 2 schematically illustrates application of an edge bias to a test pattern according to an embodiment of the present disclosure.

FIG. 2 shows original test patterns including a first test pattern 200a having a crank shape and a second test pattern 210a having a rectangular shape. The shapes of the test patterns are not limited to those shown in FIG. 2. The first pattern 200a has edges 201a, 202a, 203a, 204a, 205a, 206a, 207a and 208a, and the second pattern 210a has edges 211a, 212a, 213a and 214a. In some embodiments, a negative amount of wafer edge bias is given to the first test pattern 200a. Thus, the first test pattern 200b after the wafer edge bias is given has edges 201b, 202b, 203b, 204b, 205b, 206b, 207b and 208b. In some embodiments, a positive amount of wafer edge bias is given to the second test pattern 210a. Thus, the second test pattern 210b after the wafer edge bias is given has edges 211b, 212b, 213b and 214b.

Figure 3:
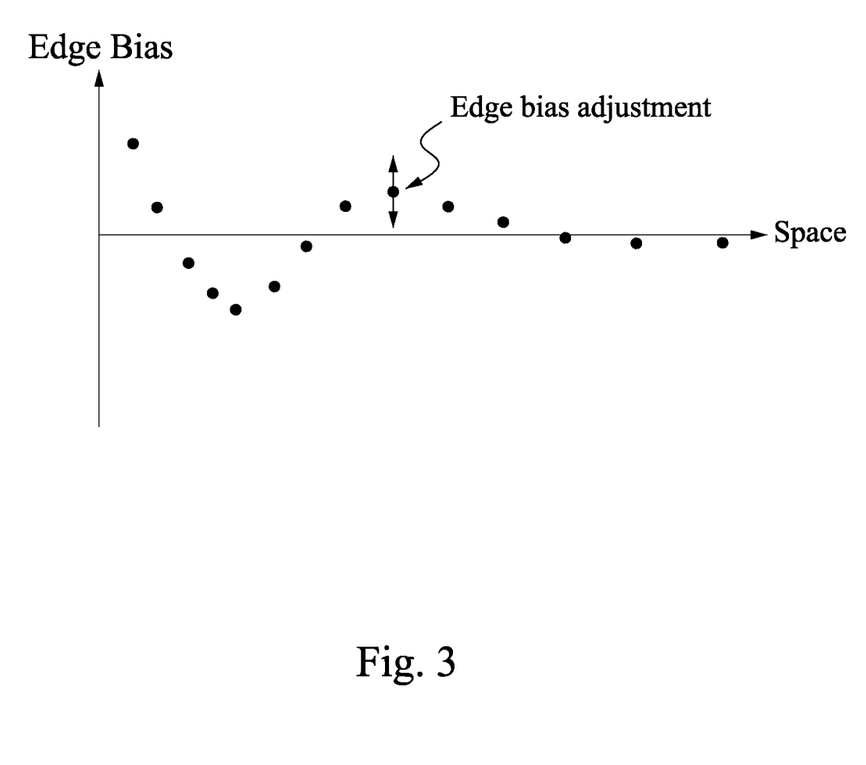
FIG. 3 shows a wafer bias amount with respect to a space between a given edge to another edge according to some embodiments of the present disclosure.

The initial wafer edge bias amounts are given by an initial wafer edge bias amount table. FIG. 3 shows an initial wafer edge bias amount table according to an embodiment of the present disclosure. In FIG. 3, the wafer edge bias amount is given as a function of a space (distance) between a given (target) edge and another edge facing the given edge. In the embodiment shown in FIG. 3, the wafer edge bias amount is determined based on one parameter (space). In other embodiments, the wafer edge bias amount is determined based on two or more parameters.

In some embodiments, the calculation of the amounts of wafer edge biases is performed using an interpolation process on the wafer edge bias table.

In some embodiments, one edge is divided into a plurality of segments, and the wafer edge bias amount is determined to each of the segments.

Figure 4:
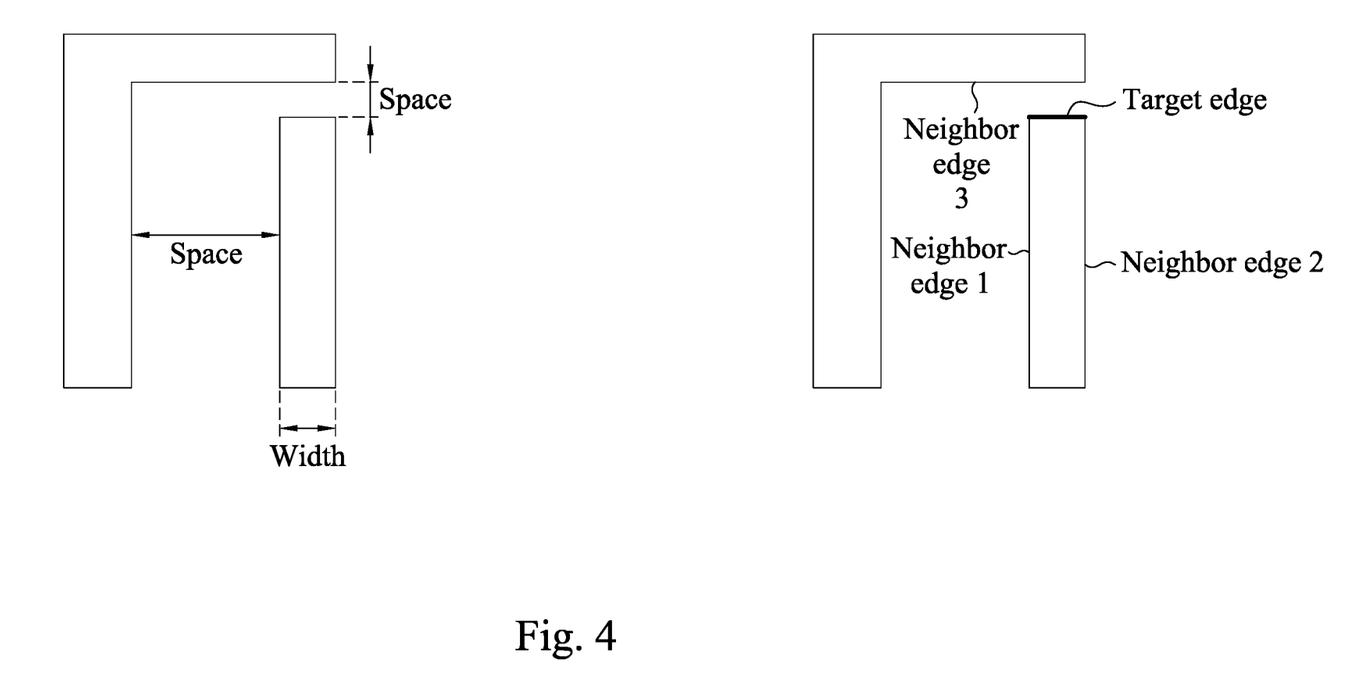
FIG. 4 shows various parameters to determine a wafer edge bias amount according to some embodiments of the present disclosure.

FIG. 4 shows various parameters to determine wafer edge bias amounts (wafer edge bias table). The parameters include geometric features, such as, but not limited to, a dimension (width) of the edge and an orientation of the edge. Other geometric features include a space (distance) between a given (target) edge and another edge, a pattern size (width, length and/or corner-to-corner distance) of the pattern having the given edge, neighbor edges' dimensions (length), and the like. FIG. 4B shows two types of neighbor edges. The first type is an adjacent neighbor edges 1 and 2, and the second type is a nonadjacent neighbor edge 3. Depending of the dimensions (length), distance or other geometric features of the neighboring edges, the edge bias amount for the target (given) edge is determined.

Returning to FIG. 1, at 116, an aerial image or a resist pattern image for the test pattern with the wafer edge bias applied is calculated or simulated using a wafer image simulator. The wafer image simulator includes one or more lithography models. In some embodiments, the lithography model describes the optical, physical and chemical processes involved in the lithography process. The lithography model includes various parameters in some embodiments. In some embodiments, the lithography model has been optimized by comparing simulated images with actually formed resist patterns.

At 118 of FIG. 1, the aerial image or the resist pattern image obtained from the lithography simulator is compared with measurement results of the actually formed resist patterns obtained at 124 of FIG. 1. In the comparison, one or more of pattern widths, lengths, spaces, shapes, corner rounding, line width roughness (LWR), and other properties are compared.

At 130 of FIG. 1, it is determined whether the simulated image using the wafer edge bias sufficiently corresponds to the actually formed pattern. If the simulated image using the wafer edge bias is sufficiently corresponds to the actually formed pattern (e.g., difference is less than a threshold value), the wafer edge bias amounts which are currently applied are fixed as a final wafer edge bias table at 250 of FIG. 1. The final wafer edge bias table is subsequently used in the lithography simulation, for example, for optimizing an OPC amount.

In various embodiments, the difference between the simulated pattern and the measured pattern is an average of the differences between a given parameter measured for several structural features present in the pattern. For example, the difference between LWR for the simulated pattern and for the measured pattern is calculated for several line structures in the pattern, and an average of the difference in LWR is compared to a threshold value to determine if further iterations are needed for improving the accuracy of the wafer edge bias table. The threshold value, in some embodiments, depends on factors such as, for example, the dimensions of the structure, complexity of the structure, types of features on the structure, density of features in the structure, etc. In some embodiments, the threshold value is about 0.1 nm, about 0.5 nm, about 1 nm, about 2 nm, or any value between any two of these values.

If the simulated image using the wafer edge bias does not sufficiently correspond to the actually formed pattern (e.g., difference is greater than a threshold value) at 130 of FIG. 1, the wafer edge bias table is adjusted or renewed at 212 of FIG. 1. In some embodiments, the wafer edge bias table is adjusted according to the differences (error amounts) between the simulated image and the actually formed pattern. The arrows shown in FIG. 3 illustrate the adjustment of the wafer edge bias.

Then, the operation returns to 112 of FIG. 1, and new wafer edge bias amounts are calculated or obtained from the adjusted wafer edge bias table, and the lithography simulation 116 and the comparison 118 are performed until the simulated image using the wafer edge bias is sufficiently corresponds to the actually formed pattern at 130.

In some embodiments, the iterative process is stopped after a certain number of iterations are reached even if the threshold value is not reached to save computation costs and time. For example, in some embodiments, the iteration is stopped after a maximum iteration number is reached. The maximum iteration number, in various embodiments, is a natural number such as 2, 5, 10, 50, 500 or any number between any two of these numbers.

In some embodiments, the wafer edge bias table is a multi-dimensional matrix in which a scalar value representing the location of a particular pattern relative to the given layout forms a first dimension, a scalar value representing an edge length of the particular pattern forms a second dimension, and a scalar value representing a distance to the nearest edge (from the particular pattern) forms a third dimension, and a scalar value representing a pattern density associated with the particular pattern forms a fourth dimension.

Figure 5:
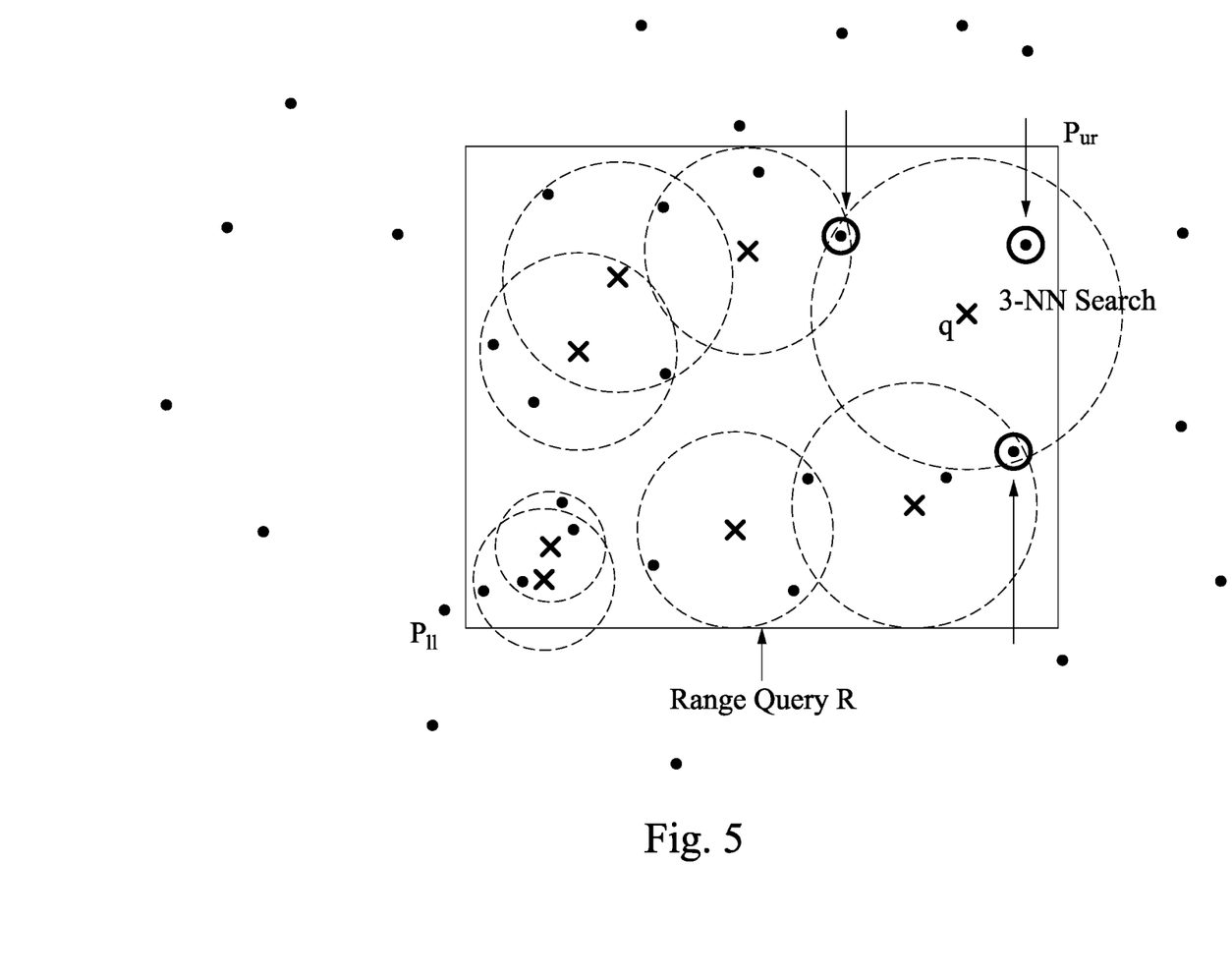
FIG. 5 shows k-nearest neighbors (KNN) when K=3 according to some embodiments of the present disclosure.

In some embodiments, the calculation of the wafer edge bias at 112 of FIG. 1 employs a machine learning algorithm, such as k-nearest neighbor, as shown in FIG. 5. At 112 of FIG. 1, for a given wafer edge bias table, the bias of an edge is a weighted average of the biases of its K nearest neighbors, where K is a natural number. K nearest neighbors are determined by a distance function. The weight of a neighbor depends on the distance between the current edge and the neighbor. FIG. 5 shows an example of the k nearest neighbors when K=3. In FIG. 5, the wafer edge bias table is a two dimensional table, and the range query R can be set to include the whole table (represented by "x"). The edge bias amount at point q is calculated using weighted interpolation of its three (K=3) nearest indicated by the arrows. In other embodiments, K is 4, 5, . . . and up to 10.

Figure 6:
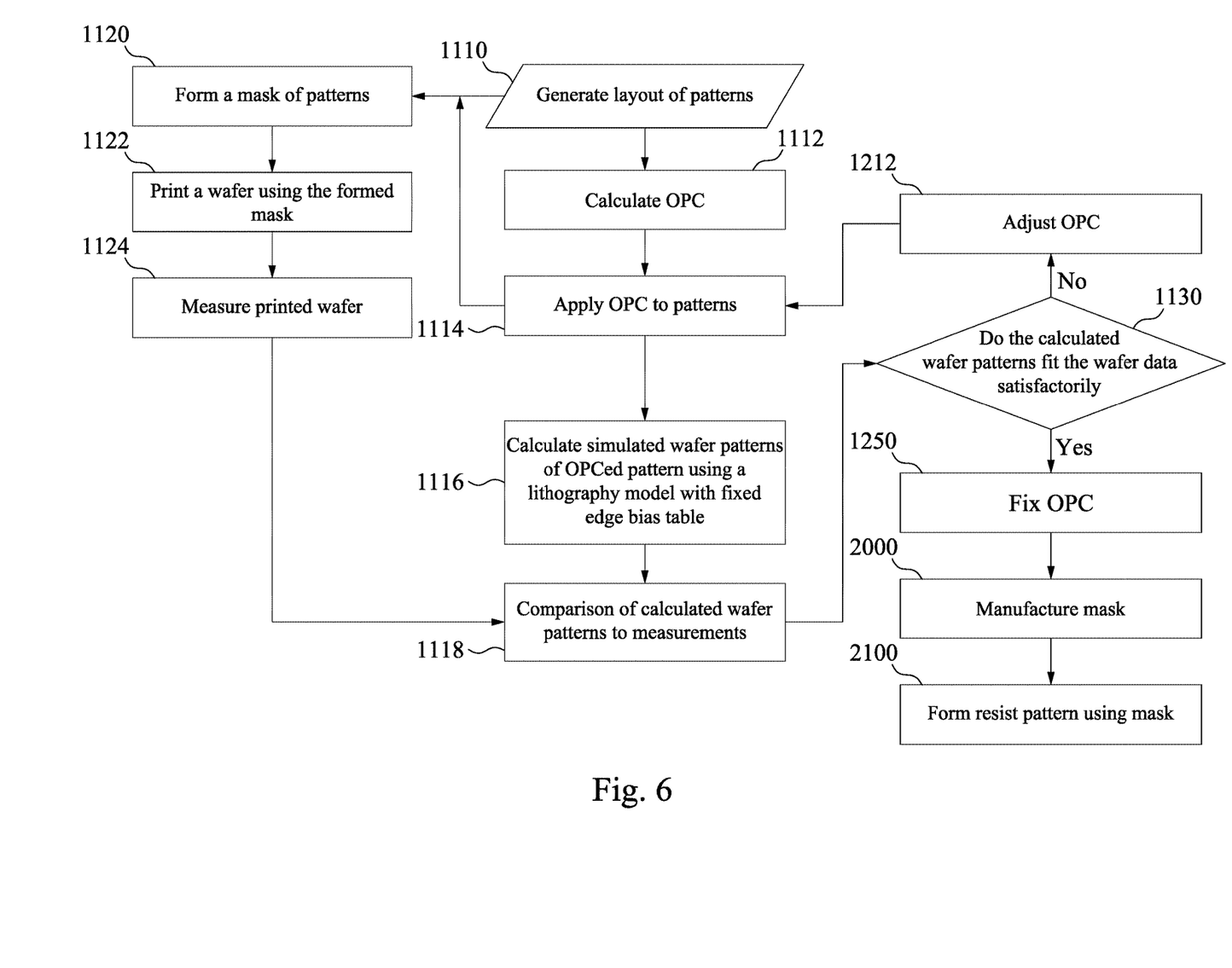
FIG. 6 illustrates a flow chart for a method of optimizing OPC (optical proximity correction) and a manufacturing of a photomask according to some embodiments of the present disclosure.

FIG. 6 illustrates a flow chart for a method of optimizing OPC (optical proximity correction) and manufacturing of a photomask according to some embodiments of the present disclosure. It is understood that additional operations can be provided before, during, and after processes shown by FIG. 6, and some of the operations described below can be replaced or eliminated, for additional embodiments of the method. The order of the operations/processes may be interchangeable. One or more of the operations shown in FIG. 6 are the same as or similar to those explained with respect to FIG. 1 and the detailed explanation may be omitted.

At 1110 of FIG. 6, a circuit layout is prepared or generated by using a computer implementing an EDA software or tool. At 1112 of FIG. 6, optical proximity correction (OPC) data are calculated and at 1114 of FIG. 6, the OPC data are applied to the circuit patterns. Then, at 1116 of FIG. 6, lithography simulation is performed using a lithography model. In some embodiments, the lithography model employs the wafer edge bias table optimized or adjusted at 250 of FIG. 1. In some embodiments, operations 1112 and 1114 are skipped for the initial circuit patterns. In other words, the pattern images are calculated for the original circuit pattern.

At 1120 of FIG. 6, a photomask of the circuit pattern is formed based on the circuit layout generated at 1110. In some embodiments, the circuit pattern includes only a part of the circuit layout and/or test patterns. At 1122, the photomask formed at 1120 is used to form a photo resist pattern on a substrate (wafer) using lithography techniques. At 1124, the photo resist patterns formed on the wafer are measured. The difference between the measured pattern obtained at 1124 and the simulated pattern obtained at 1112 (using the fixed edge biased layout obtained at 250) is used for adjusting the OPC.

At 1130 of FIG. 6, it is determined whether the simulated image using the initial OPC or without OPC is sufficiently corresponds to the actually formed pattern. If the simulated image sufficiently corresponds to the actually formed pattern (e.g., difference is less than a threshold value), the OPC data which are currently applied are fixed as a final OPC data at 1250 of FIG. 6. The threshold value, in some embodiments, depends on factors such as, for example, the dimensions of the structure, complexity of the structure, types of features on the structure, density of features in the structure, etc. In some embodiments, the threshold value is about 0.1 nm, about 0.5 nm, about 1 nm, about 2 nm, or any value between any two of these values.

If the simulated image using the initial OPC does not sufficiently correspond to the actually formed pattern (e.g., difference is greater than a threshold value) at 1130 of FIG. 6, the OPC data is adjusted or renewed at 1212 of FIG. 6. In some embodiments, the OPC data is adjusted according to the differences (error amounts) between the simulated image and the actually formed pattern. Then, the operation returns to 1112 of FIG. 6, and new OPC data are calculated or obtained, and applied to the circuit patterns at 1114. Then, the lithography simulation 1116 and the comparison 1118 are performed until the simulated image using OPC sufficiently corresponds to the actually formed pattern at 1130. In some embodiments, the iterative process is stopped after a certain number of iterations are reached even if the threshold value is not reached to save computation costs and time. For example, in some embodiments, the iteration is stopped after a maximum iteration number is reached. The maximum iteration number, in various embodiments, is a natural number such as 2, 5, 10, 50, 500 or any number between any two of these numbers.

After the OPC data are fixed at 1250 of FIG. 6, the final photomask data is generated and a photomask is manufactured according to the final photomask data at 2000 of FIG. 6. Further, a semiconductor device is fabricated by using the photomask at 2100 of FIG. 6.

Figure 7:
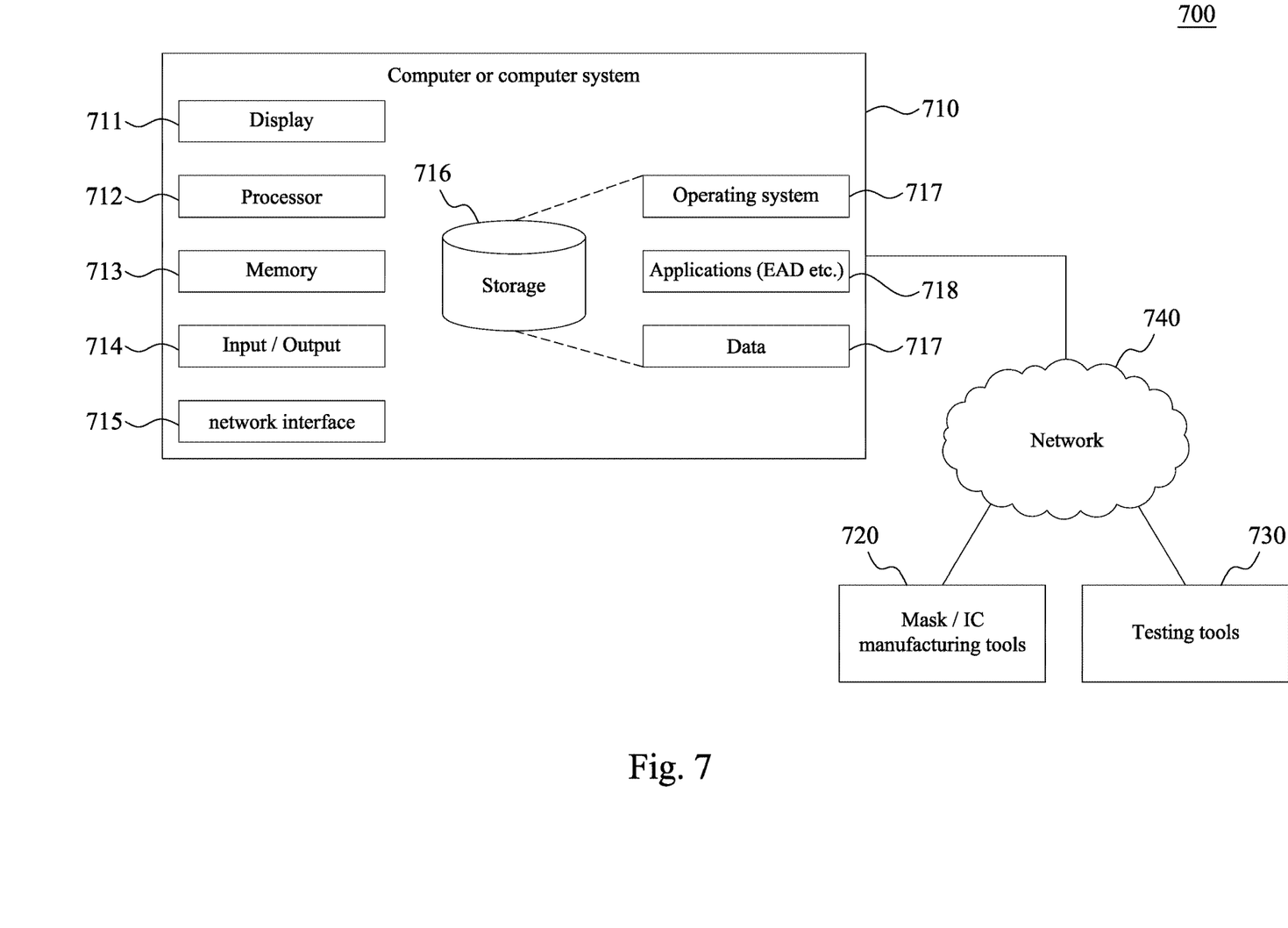
FIG. 7 illustrates a system for making an integrated circuit (IC) in accordance with some embodiments of the disclosure.

FIG. 7 illustrates a system for making an IC in accordance with some embodiments. The system 700 includes a computer or a computer system 710, mask and IC manufacturing tools 720, testing tools 730, and a wireless or wired network 740 connecting the computer system 710, the mask and IC manufacturing tools 720, and the testing tools 730 to each other to allow data exchange therebetween.

The computer or the computer system 710 includes a display 711, a processor 712, a memory 713, an input/output interface 714, a network interface 715, and a storage 716 storing an operating system 717, programs or application 718 such as EDA, and data 719.

The applications 718 can include instructions which, when executed by the computer or the computer system 710 (or the processor 712 thereof), causes the computer or the computer system 710 (or the processor 712 thereof) to perform operations, methods, and/or processes that are explicitly or implicitly described in the present disclosure.

The data 719 can include any default data including default parameters used in the modeling, any data that is received, for example, through the user input via input/output interface or through the network interface 715 transmitted from the mask/IC manufacturing tools 720 and/or testing tools 730, any data that is to be displayed on the display 711, any data that is to be transmitted to or from the mask/IC manufacturing tools 720 and/or testing tools 730 via the network 740, or any interim data generated during computation by the computer or computer system 710.

The mask and IC manufacturing tools 720 include but are not limited to an e-beam writer or an e-beam lithography tool, a photolithography tool, etc., and the testing tools 730 include but not limited to a surface profile measurement tools such as a scanning electron microscope.

As feature sizes of the devices in integrated circuits decrease, the effects of neighboring patterns are more prominent because the higher order diffraction at such proximity can be significant. This results in a substantial error in lithography models despite an extensive iterative calibration. The wafer edge bias table provides for a more accurate representation of the wafer patterns for the lithography model by incorporating the effect of neighboring structures on the structures in the wafer patterns. In addition, because the wafer edge bias table represents the effect of neighboring structures and includes scalar values, adjusting the wafer edge bias table is computationally inexpensive. Thus, by using the wafer edge bias table, a computationally less expensive calibration of the lithography model is realized, and any potential errors resulting from the coarsely calibrated lithography model are compensated using a wafer edge bias table which can be tuned using a computationally less expensive process, in various embodiments.

It will be understood that not all advantages have been necessarily discussed herein, no particular advantage is required for all embodiments or examples, and other embodiments or examples may offer different advantages.

According to an aspect of the present disclosure, in a method of optimizing a lithography model in a lithography simulation, a mask is formed in accordance with a given layout, a wafer is printed using the mask, a pattern formed on the printed wafer is measured, a wafer pattern is simulated using a wafer edge bias table and the given mask layout, a difference between the simulated wafer pattern and the measured pattern is obtained, and the wafer edge table is adjusted according to the difference. In one or more of the foregoing and following embodiments, in the adjusting the wafer edge table, when the difference between the simulated wafer pattern and the measured pattern is greater than a threshold and a limit for a number of iterations has not been reached, the wafer edge bias table is adjusted according to the difference between the simulated wafer pattern and the measured pattern to obtain an adjusted wafer edge bias table. Further the wafer pattern is re-simulated using the adjusted wafer edge bias table. In one or more of the foregoing and following embodiments, in the adjusting the wafer edge table, when the difference between the simulated wafer pattern and the measured pattern is less than the threshold or when the limit for the number of iterations has reached, a current wafer edge bias table is adopted and the current wafer edge bias table is applied to the lithography model. In one or more of the foregoing and following embodiments, the wafer edge bias table includes at least one selected from the group consisting of a scalar value corresponding to each pattern of the given layout, the scalar value being dependent on a geometry feature of the respective pattern, a location of the respective pattern relative to the given layout, and a geometry feature of a neighboring pattern neighboring the respective pattern. In one or more of the foregoing and following embodiments, the geometry feature of the respective pattern includes at least one selected from the group consisting of a length of an edge of the pattern, an orientation of the pattern, and an orientation of the edge relative to the pattern. In one or more of the foregoing and following embodiments, the geometry feature of neighboring pattern neighboring includes at least one selected from the group consisting of a line width of an edge of the neighboring pattern, a space width of the edge of the neighboring pattern, length of an edge of the neighboring pattern, density of edges in the neighboring pattern, and corner-to-corner distances in the neighboring pattern. In one or more of the foregoing and following embodiments, the neighboring pattern includes a pattern of a nearest neighbor of the respective pattern. In one or more of the foregoing and following embodiments, the neighboring pattern includes patterns of k-nearest neighbors of the respective pattern, wherein k is a natural number. In one or more of the foregoing and following embodiments, the scalar value is dependent on a weighted average of biases of the k-nearest neighbors. In one or more of the foregoing and following embodiments, the k-nearest neighbors are determined as a function of a distance relative to an edge of the respective pattern. In one or more of the foregoing and following embodiments, a weight of a given neighbor depends on a distance of the given neighbor relative to the edge of the respective pattern. In one or more of the foregoing and following embodiments, simulating the pattern includes using a plurality of wafer edge bias tables, each comprising a scalar value corresponding to incrementally higher order neighbors.

In accordance with another aspect of the present disclosure, in a method of manufacturing a semiconductor device, (i) a test mask is formed in accordance with a test layout, (ii) a test wafer pattern is formed using the test mask, (iii) the test wafer pattern is measured, (iv) a pattern is simulated using a wafer edge bias table for the test layout, (v) a difference between the simulated pattern and the measured test wafer pattern is obtained, (i)-(v) are repeated until the difference between the simulated pattern and the measured test wafer pattern is smaller than a threshold or a limit for a number of iterations has been reached, thereby obtaining a adjusted wafer edge table, optical proximity correction (OPC) data is obtained by simulating a circuit pattern using the adjusted wafer edge table, a photomask is manufactured using the obtained OPC data, and a semiconductor device is measured using the photomask. In one or more of the foregoing and following embodiments, the wafer edge bias table includes at least one selected from the group consisting of a scalar value corresponding to each pattern of the given layout, the scalar value being dependent on a geometry feature of the respective pattern, a location of the respective pattern relative to the given layout, and a geometry feature of a neighboring pattern neighboring the respective pattern. In one or more of the foregoing and following embodiments, the geometry feature of the respective pattern includes at least one selected from the group consisting of a length of an edge of the pattern, an orientation of the pattern, and an orientation of the edge relative to the pattern. In one or more of the foregoing and following embodiments, the geometry feature of neighboring pattern neighboring includes at least one selected from the group consisting of a line width of an edge of the neighboring pattern, a space width of the edge of the neighboring pattern, length of an edge of the neighboring pattern, density of edges in the neighboring pattern, and corner-to-corner distances in the neighboring pattern. In one or more of the foregoing and following embodiments, the neighboring pattern includes a pattern of a nearest neighbor of the respective pattern.

In accordance with another aspect of the present disclosure, a lithography simulator includes a non-transitory computer-readable memory storing a program and a wafer edge bias table, and a processor operatively coupled with the memory. The program, when executed by the processor, causes the processor to perform a lithography simulation using the wafer edge bias table. In one or more of the foregoing and following embodiments, the wafer edge bias table includes at least one selected from the group consisting of a scalar value corresponding to each pattern of the given layout, the scalar value being dependent on a geometry feature of the respective pattern, a location of the respective pattern relative to the given layout, and a geometry feature of a neighboring pattern neighboring the respective pattern. In one or more of the foregoing and following embodiments, the geometry feature of the respective pattern includes at least one selected from the group consisting of a length of an edge of the pattern, an orientation of the pattern, and an orientation of the edge relative to the pattern.

The foregoing outlines features of several embodiments or examples so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments or examples introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A method of manufacturing a semiconductor device, the method comprising:
    obtaining optical proximity correction (OPC) data by performing OPC to a circuit pattern using an wafer edge bias table;
    manufacturing a photomask using the obtained OPC data; and
    manufacturing a semiconductor device using the photomask,
    wherein the wafer edge bias table comprises at least one selected from the group consisting of a scalar value corresponding to a target pattern of a given layout, the scalar value being dependent on a geometry feature of the target pattern, a location of the target pattern relative to the given layout, and a geometry feature of a neighboring pattern neighboring the target pattern.

2. The method of claim 1, wherein the wafer edge bias table comprises the geometry feature of the neighboring pattern.

3. The method of claim 2, wherein the geometry feature of the neighboring pattern neighboring the target pattern comprises at least one selected from the group consisting of a line width of an edge of the neighboring pattern, a space width of the edge of the neighboring pattern, a length of an edge of the neighboring pattern, a density of edges in the neighboring pattern, and a corner-to-corner distance in the neighboring pattern.

4. The method of claim 2, wherein the neighboring pattern comprises a pattern of a nearest neighbor of the target pattern.

5. The method of claim 2, wherein the neighboring pattern comprises patterns of k-nearest neighbors of the target pattern, wherein k is a natural number.

6. The method of claim 1, wherein the wafer edge bias table comprises the scalar value corresponding to each pattern of the given layout.

7. The method of claim 6, wherein the scalar value is dependent on a weighted average of biases of k-nearest neighbors of the target pattern, wherein k is a natural number.

8. The method of claim 7, wherein the k-nearest neighbors are determined as a function of a distance relative to an edge of the target pattern.

9. The method of claim 8, wherein a weight of a given neighbor depends on a distance of the given neighbor relative to the edge of the target pattern.

10. The method of claim 6, wherein the geometry feature of the target pattern comprises at least one selected from the group consisting of a length of an edge of the target pattern, an orientation of the target pattern, and an orientation of the edge relative to the target pattern.

11. The method of claim 1, wherein the wafer edge bias table comprises the location of the target pattern relative to the given layout.

12. The method of claim 1, wherein the wafer edge bias table is generated by:
   (i) forming a test mask in accordance with a test layout;
   (ii) printing a test wafer pattern by optical lithography using the test mask;
   (iii) measuring the test wafer pattern;
   (iv) simulating a pattern using an initial wafer edge bias table for the test layout;
   (v) obtaining a difference between the simulated pattern and the measured test wafer pattern; and
   repeating (i)-(v) until the difference between the simulated pattern and the measured test wafer pattern is smaller than a threshold or a limit for a number of iterations has been reached.

13. The method of claim 12, wherein the optical lithography is extreme ultra violet lithography.

14. A lithography simulator comprising:
   a non-transitory computer-readable memory storing a program; and
   a processor operatively coupled with the memory, wherein:
   the program, when executed by the processor, causes the processor to perform an optical proximity correction to a circuit pattern including a target pattern using a wafer edge bias table,
   the wafer edge bias table comprises a scalar value corresponding to each pattern of the given layout,
   the scalar value is dependent on a geometry feature of a pattern, and
   the geometry feature of the target pattern comprises at least one selected from the group consisting of a length of an edge of the target pattern, an orientation of the target pattern, and an orientation of the edge relative to the target pattern.

15. The lithography simulator of claim 14, wherein the scalar value is dependent on a weighted average of biases of k-nearest neighbors of the target pattern, wherein k is a natural number.

16. The lithography simulator of claim 15, wherein the k-nearest neighbors are determined as a function of a distance relative to an edge of the target pattern.

17. The lithography simulator of claim 16, wherein a weight of a given neighbor depends on a distance of the given neighbor relative to the edge of the target pattern.

18. The lithography simulator of claim 14, wherein the geometry feature of the target pattern comprises an orientation of the target pattern.

19. A lithography simulator comprising:
   a non-transitory computer-readable memory storing a program; and
   a processor operatively coupled with the memory,
   wherein the program, when executed by the processor, causes the processor to perform an optical proximity correction to a circuit pattern using a wafer edge bias table,
   the wafer edge bias table comprises a geometry feature of a neighboring pattern neighboring a target pattern, and
   the geometry feature of the neighboring pattern neighboring the target pattern comprises at least one selected from the group consisting of a line width of an edge of the neighboring pattern, a space width of the edge of the neighboring pattern, a length of an edge of the neighboring pattern, a density of edges in the neighboring pattern, and a corner-to-corner distance in the neighboring pattern.

20. The lithography simulator of claim 19, wherein the geometry feature of the neighboring pattern neighboring the target pattern comprises at least one selected from the group consisting of a density of edges in the neighboring pattern, and a corner-to-corner distance in the neighboring pattern.

* * * * *